United States Patent
Li et al.

(10) Patent No.: US 9,629,014 B2
(45) Date of Patent: Apr. 18, 2017

(54) METHOD FOR NOTIFYING INTERFERENCE MEASUREMENT REFERENCE INFORMATION, METHOD AND DEVICE FOR MEASURING INTERFERENCE

(75) Inventors: Yu Ngok Li, Shenzhen (CN); Yijian Chen, Shenzhen (CN); Yunfeng Sun, Shenzhen (CN); Jun Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 396 days.

(21) Appl. No.: 14/364,701

(22) PCT Filed: Dec. 30, 2011

(86) PCT No.: PCT/CN2011/085023
§ 371 (c)(1),
(2), (4) Date: Jun. 12, 2014

(87) PCT Pub. No.: WO2012/155520
PCT Pub. Date: Nov. 22, 2012

(65) Prior Publication Data
US 2015/0124717 A1    May 7, 2015

(30) Foreign Application Priority Data
Jul. 15, 2011 (CN) .......................... 2011 1 0199384

(51) Int. Cl.
*H04W 4/00* (2009.01)
*H04W 24/10* (2009.01)
*H04L 5/00* (2006.01)

(52) U.S. Cl.
CPC .......... *H04W 24/10* (2013.01); *H04L 5/0048* (2013.01); *H04L 5/0023* (2013.01)

(58) Field of Classification Search
CPC ..... H04W 24/10; H04L 5/0048; H04L 5/0023
See application file for complete search history.

(56) References Cited

U.S. PATENT DOCUMENTS

| 8,929,291 B2 * | 1/2015 | Kim .................... H04W 52/243 370/328 |
|---|---|---|
| 2008/0186919 A1 * | 8/2008 | Huang .............. H04W 36/0088 370/331 |

(Continued)

FOREIGN PATENT DOCUMENTS

| CN | 101931957 A | 12/2010 |
|---|---|---|
| CN | 101971661 A | 2/2011 |

(Continued)

OTHER PUBLICATIONS

International Search Report for PCT/CN2011/085023 dated Mar. 28, 2012.

*Primary Examiner* — Phuc Tran
(74) *Attorney, Agent, or Firm* — Ling Wu; Stephen Yang; Ling and Yang Intellectual Property

(57) ABSTRACT

Disclosed in the present document is a method for notifying interference measurement reference information, and a method and apparatus for measuring interference, wherein a base station notifies a terminal of interference measurement reference information which specifies a reference signal used for interference measurement and/or a reference resources position for interference measurement. According to the solution in the present document, in a distributed antenna system, the base station, through an interference measurement reference message, specifies for the terminal the reference signal used for interference measurement and/or the reference resources position for interference measurement; after receiving the interference measurement reference information, the terminal performs interference measurement according to the reference signal and/or the (Continued)

reference resources position for interference measurement specified by the base station.

11 Claims, 2 Drawing Sheets

(56) References Cited

U.S. PATENT DOCUMENTS

| | | | |
|---|---|---|---|
| 2009/0268630 A1* | 10/2009 | Yellin | H04L 5/0007 370/252 |
| 2010/0197330 A1 | 8/2010 | Astely et al. | |
| 2010/0234054 A1* | 9/2010 | Ko | H04B 7/024 455/501 |
| 2010/0254471 A1 | 10/2010 | Ko et al. | |
| 2010/0285810 A1 | 11/2010 | Ko et al. | |
| 2012/0315859 A1* | 12/2012 | Lee | H04J 11/005 455/67.13 |

FOREIGN PATENT DOCUMENTS

| | | |
|---|---|---|
| CN | 102006603 A | 4/2011 |
| CN | 102300244 A | 12/2011 |
| WO | 2011013989 A2 | 2/2011 |

\* cited by examiner

METHOD FOR NOTIFYING INTERFERENCE MEASUREMENT REFERENCE INFORMATION, METHOD AND DEVICE FOR MEASURING INTERFERENCE

TECHNICAL FIELD

The present document relates to the technical field of communications, and in particular, to a method for notifying interference measurement reference information and a method and an apparatus for measuring interference.

BACKGROUND OF THE RELATED ART

In a Long Term Evolution (LTE for short) system, information reflecting a downlink physical channel state (Channel State Information, CSI for short) primarily comprises three parts of content: a Channels Quality Indication (CQI for short), a Pre-coding Matrix Indicator (PMI for short), and a Rank Indicator (RI for short).

The CQI is an index evaluating the quality of the downlink channel. In the 3GPP TS 36.213 protocol, the CQI is represented by integer values of 0~15, which represent different CQI levels respectively. Different CQIs correspond to respective Modulation and Coding Schemes (MCS for short), which are divided into 16 conditions, and may be represented with 4-bit information, as shown in table 1 below.

TABLE 1

Relationship between CQI indexes and MCSs

| CQI index | Modulation mode | Code rate x 1024 | Efficiency |
|---|---|---|---|
| 0 | | exceed | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In the LTE, the meaning of feedback of the CQI is that a UE selects a suitable transmission block modulation and coding level to be recommended to a base station according to the channel quality, so that the base station performs modulation and coding according to the information, and can achieve a channel transmission capability thereof to the best extent.

From another perspective, the CQI can also be considered as quantification of channel quality information, and if the quality is good, higher order modulation and coding mode may be supported, to obtain a higher speed, and if the quality is poor, transmission can only be performed in a lower order modulation and coding mode, to ensure the robustness of the transmission; and in the Multiple Input and Multiple Output (MIMO) technology, for the recommended CQI, there are generally following hypothesis.

(1) the base station uses the recommended RI as the number of layers of spatial multiplexing, and transmits data with the number being RI at the same time, and uses a layer mapping mode specified in the protocol;

(2) the pre-coding process is performed on the signal using the recommended PMI;

(3) the interference and noise are measured by the UE.

According to (1), (2) and (3) and using a receiving algorithm actually used by the terminal, the CQI is calculated according to a Signal Interference Noise Ratio (SINR) obtained after being processed by the receiving algorithm.

There are relatively mature algorithms to calculate the RI, PMI and CQI, for example, best RI, PMI and CQI are selected using a maximum capacity criteria. Generally, the RI/PMI/CQI are not selected independently with each other, and the selecting algorithm is generally a unified selection. The accuracy degree for calculating and selecting the RI/PMI/CQI is influenced by two aspects, i.e., channel measurement and interference and noise measurement.

The channel measurement may be based on a Common Reference Signal (CRS) or a Channel State Information-Reference Signal (CSI-RS) in the LTE/LTE-A system. At present, due to a good pilot design, an accurate channel may be measured through the CRS or CSI-RS.

Interference and noise measurement is a technical bottleneck, and incorrect interference information may result in mismatch between the number of layers and an actual channel quality condition. For example, only 2 layers are actually supported, but it may be misjudged to support 4 layers due to a measurement error of the interference and noise information, thus leading to a high bit error rate. Alternatively, only low order coding and modulation mode can actually be supported, however, it may be misjudged to support a high order coding and modulation mode, thus also leading to a high bit error rate. On the contrary, it may be possible to support multiple layers and higher order coding and modulation mode, but actually, only less layers and low order coding mode are used for transmission, thus leading to a waste of transmission resources.

Nose measurement is generally relatively simple, since noise is generated due to reasons of the devices themselves. Interferences primarily come from other cells or other nodes, and as the transmission technologies of other cells or transmission modes are different, for example, the pre-coding is different, or the transmitted signals are different, it may result in a change of the interference condition. Therefore, the interference measurement is a primary technical problem needed to be solved in the related art.

There are many interference measurement methods in the related art, which primarily include the following three methods: performing interference measurement based on a CRS, performing interference measurement based on a CSI-RS, and performing interference measurement based on a dedicated demodulation pilot or transmitted data.

An idea of the interference measurement based on a CRS is to use the interference experienced by the CRS as an interference experienced by a data signal. Such method is a current dominant method, and the interference experienced by the CRS and the interference experienced by the data are usually considered to be similar. In addition, due to a high density of the CRS, interference information and reference signal information can be distinguished to a certain extent according to the correlation of the channels. Therefore, the performance of the channel estimation is good. But a problem that patterns of the CRS among cells are the same (which is due to a high density) may frequently exist.

Another method is to perform interference measurement according to the CSI-RS. As the density of the CSI-RS is relatively sparse when the interference measurement is performed according to the CSI-RS, the interference performance is slightly poor. However, a problem that patterns of the CRS among cells are the same (which is due to a high density) frequently exits, therefore, part of interference measured by the CRS is pilot interference from other cells instead of data interference, and from this perspective, some inaccuracy exists. The problem does not exist with the CSI-RS due to a low pilot density. Therefore, it may select to perform interference measurement using the CSI-RS.

Interference measured by the method for measuring interference based on a dedicated demodulation pilot or transmitted data is relatively accurate and precise. But the implementation thereof is relatively complex, and needs to depend on previous downlink data transmission, while the downlink data transmission does not always exist in each subframe, and there are downlink data only in part of positions in a frequency domain.

In the current LTE/LTE-A standard, there is no limitation on adoption of a method for measuring interference based on a CRS, a method for measuring interference based on a CSI-RS, or a method for measuring interference based on a dedicated demodulation pilot or transmitted data, and the terminal may perform interference measurement randomly by using the method which is considered to be better or other methods which are not mentioned.

Any of the interference measurement technologies mentioned above may be suitable for interference measurement in a traditional cell or a traditional antenna configuration. Therefore, the base station may not limit the interference measurement for the terminal. But a problem that a system does not limit which method will be adopted for measuring interference for the terminal in the related art lies in that it is not suitable for a distributed antenna system.

SUMMARY OF THE INVENTION

As shown in FIG. 1, the CRS configuration of the distributed antenna system uses a configuration method of a Single Frequency Network (SFN), and one or two antennas are virtualized as one CRS port by each transmission node; while the CSI-RS uses a local configuration method and each transmission node is configured with a set of CSI-RSs.

In order to obtain a space splitting gain, the distributed antenna system frequently uses a transmission mode of multi-user space division multiplexing, and transmission nodes with co-time co-frequency and different positions serve multiple different users. As shown in FIG. 2, multiple transmission nodes therein belong to the same cell. After further analysis, it can be found that in such system, performing interference measurement based on a CRS can not reflect interference with the UE due to other transmission nodes within the cell with co-time co-frequency transmission resource positions. Therefore, it is better to perform interference measurement using a CSI-RS.

Similarly, some UEs are combined to serve a certain terminal by antennas of all nodes using a same SFN mode as the CRS port. Redundant interference will be produced by calculating based on the CSI-RS measurement. Therefore, it may be more appropriate to perform interference measurement based on a CRS.

But the following technical problem also exists in the related art: for a distributed antenna system, a base station needs to limit interference measurement for a terminal, and notify the terminal of corresponding interference measurement reference information.

The technical problem to be solved by the present document is to provide a method for notifying interference measurement reference information and a method and apparatus for measuring interference, wherein, a base station notifies a terminal of interference measurement reference information.

In order to solve the above technical problem, the present document provides a method for notifying interference measurement reference information, wherein, a base station notifies a terminal of interference measurement reference information which specifies a reference signal used for interference measurement and/or a reference resource position for interference measurement.

Preferably, the reference signal used for interference measurement specified in the interference measurement reference information comprises a Common Reference Signal (CRS), or a Channel State Information-Reference Signal (CSI-RS).

Preferably, the reference resource position for interference measurement specified in the interference measurement reference information is a set of part of Resource Elements (REs) within one or more Transmission Time Intervals (TTIs).

Preferably, the set of REs is a set of multiple incompletely continuous REs.

Preferably, the base station, using high-level signaling, notifies the terminal of the interference measurement reference information which specifies the reference signal used for interference measurement and/or the reference resource position for interference measurement in the high-level signaling.

Preferably, the interference measurement reference information is of 1 bit, which is used to instruct to perform interference measurement according to the CRS or perform interference measurement according to the CSI-RS; or the interference measurement reference information is of 2 bits, which are used to instruct to perform interference measurement according to the CRS, performing interference measurement according to the CSI-RS, perform interference measurement according to a DMRS, or perform interference measurement according to data.

Preferably, the base station jointly encodes the reference signal used for interference measurement together with a channel measurement reference information indication.

The present document further provides a method for measuring interference, comprising:

a terminal receiving interference measurement reference information notified by a base station, and performing interference measurement according to a reference signal used for interference measurement and/or a reference resource position for interference measurement specified in the interference measurement reference information.

In addition, the present document further provides an apparatus for notifying interference measurement reference information, applied in a base station, comprising a reference information notification unit, wherein the reference information notification unit is configured to notify a terminal of interference measurement reference information which specifies a reference signal used for interference measurement and/or a reference resource position for interference measurement.

Preferably, the reference information notification unit is configured to specify the following reference signals used for interference measurement in the interference measurement reference information: a Common Reference Signal (CRS), or a Channel State Information-Reference Signal (CSI-RS).

Preferably, the reference information notification unit is configured as that the reference resource position for interference measurement specified in the interference measurement reference information is a set of part of REs within one or more TTIs, wherein, the set of REs is a set of multiple incompletely continuous REs.

Preferably, the reference information notification unit is configured to notify the terminal of the interference measurement reference information using high-level signaling and specify the reference signal used for interference measurement and/or the reference resource position for interference measurement in the high-level signaling.

Preferably, the reference information notification unit is configured to:

instruct, through 1-bit interference measurement reference information in the high-level signaling, to perform interference measurement according to the CRS or perform interference measurement according to the CSI-RS; or instruct, through 1-bit interference measurement reference information in the high-level signaling, to perform interference measurement according to the CRS, perform interference measurement according to the CSI-RS, perform interference measurement according to a DMRS, or perform interference measurement according to data; or jointly encode the reference signal used for interference measurement together with a channel measurement reference information indication.

In addition, the present document further provides an apparatus for measuring interference, applied in a terminal, comprising a reference information reception unit and an interference measurement unit, wherein, the reference information reception unit is configured to receive interference measurement reference information notified by a base station, which specifies a reference signal used for interference measurement and/or a reference resource position for interference measurement; and the interference measurement unit is configured to perform interference measurement according to the reference signal used for interference measurement and/or the reference resource position for interference measurement specified in the interference measurement reference information.

According to the above solution of the present document, in a distributed antenna system, the base station specifies, through an interference measurement reference message, a reference signal used for interference measurement and/or a reference resource position for interference measurement for a terminal; and after receiving the interference measurement reference information, performs interference measurement according to the reference signal and/or the reference resource position for interference measurement specified by the base station.

BRIEF DESCRIPTION OF DRAWINGS

The accompanying drawings described herein are used to provide a better understanding of the present document and constitute part of this application, and the schematic embodiments of the present document and the descriptions thereof are used to explain the present document and do not constitute an improper definition of the present document. In the accompanying drawings.

PREFERRED EMBODIMENTS OF THE INVENTION

The present embodiment provides a method for notifying interference measurement reference information, comprising:

a base station notifying a terminal of interference measurement reference information which specifies a reference signal used for interference measurement and/or a reference resource position for interference measurement.

Wherein, the reference signal used for interference measurement specified in the interference measurement reference information comprises a CRS, or a CSI-RS.

The reference resource position for interference measurement specified in the interference measurement reference information is a set of part of Resource Elements (REs) within one or more Transmission Time Intervals (TTIs).

Wherein, the set of part of REs within the TTI is a set of multiple incompletely continuous REs, wherein, the RE is a minimum resource unit defined for the LTE.

Further, the terminal performs interference measurement according to the reference signal used for interference measurement and/or the reference resource position for interference measurement specified in the interference measurement reference information notified by the base station.

Further, the base station notifies the terminal of the reference signal used for interference measurement and/or the reference resource position for interference measurement by using high-level signaling.

Further, the interference measurement reference information may be 1-bit or 2-bit indication information.

Further, the base station may further jointly encode the reference signal used for interference measurement together with a channel measurement reference information indication.

In order to make the purpose, technical schemes and advantages of the present document more clear and apparent, the embodiments of the present document will be further illustrated in detail hereinafter with respect to accompanying drawings. It should be illustrated that, in the case of no conflict, the embodiments of this application and the features in the embodiments could be combined randomly with each other.

Embodiment One

Figure 1:
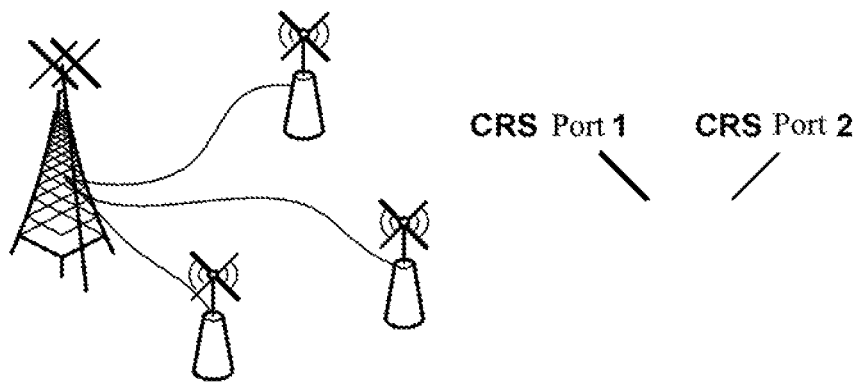
FIG. 1 is a diagram of a CRS configuration in a distributed antenna system.
Figure 2:
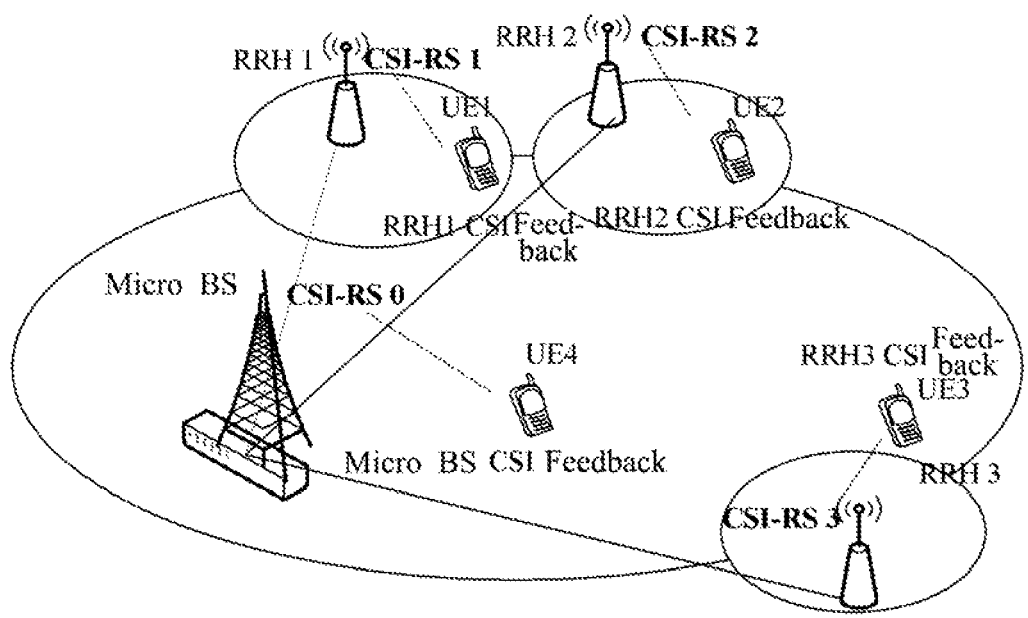
FIG. 2 is a diagram of a relationship between a CRI-RS configuration and a service in a distributed antenna system.

The scenario described in this embodiment is based on a distributed multi-antenna system, wherein, the configuration of antennas and antenna ports is as shown in FIG. 2.

Firstly, a base station determines a channel measurement reference pilot of a terminal to be a CSI-RS, and the terminal selects a serving node according to the CSI-RS. For example, UE1 selects a serving node as Remote Radio Head (RRH1), at a co-time co-frequency position where the RRH1 serves UE1, RRH2 also serves UE2, RRH3 also serves UE3, and Macro also serves UE4. At this time, the UE is interfered by signals transmitted by the RRH2, RRH3 and Macro.

Such transmitted signals not only interfere with the data of UE1, but also interfere with the CSI-RS of UE1. However, due to the position of the CRS, RRH2, RRH3 and Macro do not transmit data and a CRS reference signal is transmitted jointly by the RRH1, RRH2, RRH3 and Macro for SFN combining Therefore, the CRS can not embody the interference experienced by the user data.

While the measurement and report of channel quality information are primarily for the purpose of data transmission, and therefore, the base station selects the CSI-RS as an interference measurement reference signal at this time, and notifies the terminal of the interference measurement reference information through high-level signaling.

After receiving the interference measurement reference information, the terminal performs interference measurement according to the CSI-RS.

Embodiment Two

The scenario described in this embodiment is based on a distributed multi-antenna system, wherein, the configuration of antennas and antenna ports is as shown in FIG. 2.

Firstly, the base station determines a channel measurement reference pilot of a terminal as the CRS, and it is a TDD mode, the terminal does not feed back the PMI and RI, and only feeds back the CQI.

However, the terminal measures RSRP (large-scale fading channel information, which embodies a distance between a user and a transmission node) according to the CSI-RS to select a serving node. For example, UE1 selects the serving node as RRH1, at a co-time co-frequency position where the RRH1 serves UE1, RRH2 also serves UE2, RRH3 also serves UE3, and Macro also serves UE4. At this time, the UE is interfered by signals transmitted by the RRH2, RRH3 and Macro.

Such transmitted signals not only interfere with the data of UE1, but also interfere with the CSI-RS of UE1. However, due to the position of the CRS, the RRH2, RRH3 and Macro do not transmit data and a CRS reference signal is transmitted jointly by the RRH1, RRH2, RRH3 and Macro for SFN combining Therefore, the CRS can not embody the interference experienced by user data.

While the measurement and report of channel quality information are primarily for the purpose of data transmission, and therefore, the base station selects the CSI-RS as an interference measurement reference signal at this time, and notifies the terminal of the interference measurement reference information through high-level signaling.

After receiving the interference measurement reference information, the terminal performs interference measurement according to the CSI-RS.

Embodiment Three

The scenario described in this embodiment is based on a distributed multi-antenna system, wherein, the configuration of antennas and antenna ports is as shown in FIG. 2.

Firstly, the base station determines a channel measurement reference pilot of a terminal as the CRS, and the demodulation pilot is also the CRS. During data transmission, various nodes use the same SFN combining mode as the CRS to transmit data to the same user. At this time, all co-time co-frequency nodes only serve the same user, and there is no interference due to transmitted signals from nodes within a cell, and there is only the interference due to transmitted signals from nodes outside the cell.

At this time, interference from nodes within the cell can be measured according to the CSI-RS. However, the data actually are not interfered by nodes in the cell, and what are transmitted by the nodes in the cell to the user are useful data. Therefore, the CRI-RS can not represent interference conditions well. At this time, the base station selects the CRS as an interference measurement reference signal, and notifies the terminal of the interference measurement reference information through high-level signaling.

After receiving the interference measurement reference information, the terminal performs interference measurement according to the CRS.

Specifically, in the above embodiments one, two and three, when the base station notifies the terminal of the reference signal used for the interference measurement through the interference measurement reference information, the base station may use 1-bit information, which represents 2 states respectively, specifically as shown in table 2 below:

TABLE 2

Interference measurement reference information table one

| State | Meaning |
|---|---|
| 0 | performing interference measurement according to a CRS |
| 1 | performing interference measurement according to a CSI-RS |

In addition, 2-bit information may also be used, which represents 4 states, specifically as shown in table 3 below:

TABLE 3

Interference measurement reference information table two

| State | Meaning |
|---|---|
| 00 | performing interference measurement according to a CRS |
| 01 | performing interference measurement according to a CSI-RS |
| 10 | performing interference measurement according to a DMRS |
| 11 | performing interference measurement according to data |

Embodiment Four

In the present embodiment, the base station jointly encodes a channel measurement reference information indication together with interference measurement reference information. For example, a condition of 2-bit may be used, as shown in table 4 below, which represents 4 states respectively.

TABLE 4

Interference measurement reference information table three

| State | Meaning |
|---|---|
| 00 | performing channel measurement according to a CRS, and performing interference measurement according to a CRS |
| 01 | performing channel measurement according to a CRS, and performing interference measurement according to a CSI-RS |
| 10 | performing channel measurement according to a CSI-RS, and performing interference measurement according to a CRS |
| 11 | performing channel measurement according to a CSI-RS, and performing interference measurement according to a CRS |

Embodiment Five

In the present embodiment, the base station can substitute the above mode of notifying an interference measurement reference pilot with a mode of notifying a reference resource position for interference measurement.

Figure 3:
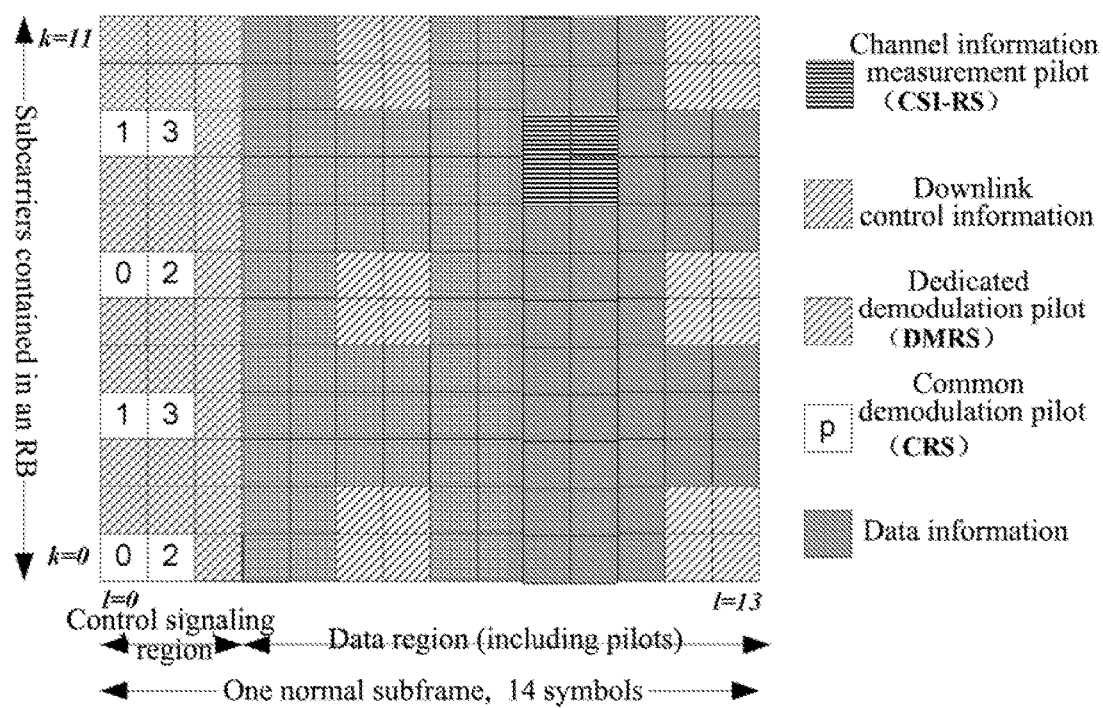
FIG. 3 is a diagram of notifying a reference resource position for interference measurement according to an embodiment of the present document.

As shown in a structural diagram of a transmission block in FIG. 3, there is one subframe in the time domain, there is one Resource Block (RB) which is defined in LTE in the time frequency domain, and there is one RE in each grid.

The base station can use a set of REs in one or more specified TTIs when notifying the reference resource position for interference measurement.

For example, the base station notifies the UE that the reference resource position of the interference is the following set of REs within one TTI:

{(0,0), (0,1), (3,0), (3,1), (6,0), (6,1), (9,0), (9,1)}.

For example, the base station notifies the UE that the reference resource position of the interference is the following set of REs within one TTI:

(k,l) represents a RE, and the set is {(0,5), (0,6), (0,12), (0,13), (1,5), (1,6), (1,12), (1,13), (5,5), (5,6), (5,12), (5,13), (6,5), (6,6), (6,12), (6,13), (10,5), (10,6), (10,12), (10,13), (11,12), (11,5), (11,6), (11,13)}.

For example, the base station notifies the UE that the reference resource position of the interference is the following set of REs within one TTI:

{(8,9), (8,10), (9,9), (9,10)}.

In addition, the embodiments of the present document further provide an apparatus for notifying interference measurement reference information, applied in a base station, comprising:

a reference information notification unit, configured to notify a terminal of interference measurement reference information which specifies a reference signal used for interference measurement and/or a reference resource position for interference measurement.

Further, the reference information notification unit is configured to specify the following reference signals used for interference measurement in the interference measurement reference information: a Common Reference Signal (CRS), or a Channel State Information-Reference Signal (CSI-RS).

Further, the reference information notification unit is configured as that the reference resource position for interference measurement specified in the interference measurement reference information is a set of part of REs within one or more TTIs, wherein, the set of REs is a set of multiple incompletely continuous REs.

Further, the reference information notification unit is configured to notify the terminal of the interference measurement reference information using high-level signaling and specify the reference signal used for interference measurement and/or the reference resource position for interference measurement in the high-level signaling.

Further, the reference information notification unit is configured to:

instruct, through 1-bit interference measurement reference information in the high-level signaling, to perform interference measurement according to the CRS or perform interference measurement according to the CSI-RS; or instruct, through 1-bit interference measurement reference information in the high-level signaling, to perform interference measurement according to the CRS, perform interference measurement according to the CSI-RS, perform interference measurement according to a Demodulation Reference Signal (DMRS), or perform interference measurement according to data; or jointly encode the reference signal used for interference measurement together with a channel measurement reference information indication.

In addition, the embodiments of the present document further provide an apparatus for measuring interference, applied in a terminal, comprising a reference information reception unit and an interference measurement unit, wherein, the reference information reception unit is configured to receive interference measurement reference information notified by a base station, which specifies a reference signal used for interference measurement and/or a reference resource position for interference measurement; and the interference measurement unit is configured to perform interference measurement according to the reference signal used for interference measurement and/or the reference resource position for interference measurement specified in the interference measurement reference information.

The above description is only for the preferred embodiments of the present document and it is not intended to limit the present document, and the present document can also have a variety of other examples. Without departing from the spirit and essence of the present document, those skilled in the art can make various corresponding changes and variations based on the present document, but all these changes and variations should belong to the protection scope of the appended claims in the present document.

Obviously, those skilled in the art should understand that each module or each step of the aforementioned present document can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; and in some cases, steps illustrated or described may be implemented in an order different from the order herein, or they are respectively made into a plurality of integrated circuit modules; alternatively, it is implemented with making several modules or steps of them into a single integrated circuit module. Thus, the present document is not limited to any specific combinations of hardware and software.

INDUSTRIAL APPLICABILITY

According to the scheme of the embodiments of the present document, in a distributed antenna system, the base station specifies, through an interference measurement reference message, a reference signal used for interference measurement and/or a reference resource position for interference measurement for a terminal; and after receiving the interference measurement reference information, the terminal performs interference measurement according to the reference signal and/or the reference resource position for interference measurement specified by the base station.

What is claimed is:

1. A method for notifying interference measurement reference information, wherein,
  a base station notifies a terminal of interference measurement reference information which specifies a reference resource position for interference measurement;
  wherein the reference resource position for interference measurement specified in the interference measurement reference information is a set of part of Resource Elements (REs) within one or more Transmission Time Intervals (TTIs), wherein the set of REs for interference measurement are selected from REs comprising Channel State Information-Reference Signal (CSI-RS) REs, control REs, Demodulation Reference Signal (DMRS) REs, Common Reference Signal (CRS) REs, and data REs.

2. The method according to claim 1, wherein,
  the set of REs is a set of multiple incompletely continuous REs.

3. The method according to claim 2, wherein,
the base station, using high-level signaling, notifies the terminal of the interference measurement reference information which specifies the reference resource position for interference measurement in the high-level signaling.

4. The method according to claim 1, wherein,
the base station, using high-level signaling, notifies the terminal of the interference measurement reference information which specifies the reference resource position for interference measurement in the high-level signaling.

5. The method according to claim 4, wherein,
the base station jointly encodes a reference signal used for interference measurement together with a channel measurement reference information indication.

6. A method for measuring interference, comprising:
a terminal receiving interference measurement reference information notified by a base station, and performing interference measurement according to a reference resource position for interference measurement specified in the interference measurement reference information;
wherein the reference resource position for interference measurement specified in the interference measurement reference information is a set of part of Resource Elements (REs) within one or more Transmission Time Intervals (TTIs), wherein the set of REs for interference measurement are selected from REs comprising Channel State Information-Reference Signal (CSI-RS) REs, control REs, Demodulation Reference Signal (DMRS) REs, Common Reference Signal (CRS) REs, and data REs.

7. An apparatus for notifying interference measurement reference information, applied in a base station, comprising a processor and a storage device, the storage device storing processor executable instructions that when executed by the processor cause the processor to perform the steps in following function entity:
 a reference information notification unit, configured to notify a terminal of interference measurement reference information which specifies a reference resource position for interference measurement;
 wherein the reference information notification unit is configured as that the reference resource position for interference measurement specified in the interference measurement reference information is a set of part of Resource Elements (REs) within one or more Transmission Time Intervals (TTIs), wherein the set of REs for interference measurement are selected from REs comprising Channel State Information-Reference Signal (CSI-RS) REs, control REs, Demodulation Reference Signal (DMRS) REs, Common Reference Signal (CRS) REs, and data REs.

8. The apparatus according to claim 7, wherein,
the reference information notification unit is configured to notify the terminal of the interference measurement reference information using high-level signaling and specify the reference resource position for interference measurement in the high-level signaling.

9. The apparatus according to claim 8, wherein, the reference information notification unit is configured to:
jointly encode a reference signal used for interference measurement together with a channel measurement reference information indication.

10. The apparatus according to claim 7, wherein, the set of REs is a set of multiple incompletely continuous REs.

11. An apparatus for measuring interference, applied in a terminal, comprising a processor and a storage device, the storage device storing processor executable instructions that when executed by the processor cause the processor to perform the steps in following function entities: a reference information reception unit and an interference measurement unit, wherein,
 the reference information reception unit is configured to receive interference measurement reference information notified by a base station, which specifies a reference resource position for interference measurement; and
 the interference measurement unit is configured to perform interference measurement according to the reference resource position for interference measurement specified in the interference measurement reference information;
 wherein the reference resource position for interference measurement specified in the interference measurement reference information is a set of part of Resource Elements (REs) within one or more Transmission Time Intervals (TTIs), wherein the set of REs for interference measurement are selected from REs comprising Channel State Information-Reference Signal (CSI-RS) REs, control REs, Demodulation Reference Signal (DMRS) REs, Common Reference Signal (CRS) REs, and data REs.

* * * * *